US012105651B2

(12) United States Patent
Tarango et al.

(10) Patent No.: US 12,105,651 B2
(45) Date of Patent: *Oct. 1, 2024

(54) SOLID STATE DRIVE WITH EXTERNAL SOFTWARE EXECUTION TO EFFECT INTERNAL SOLID-STATE DRIVE OPERATIONS

(71) Applicant: SK Hynix NAND Product Solutions Corp., Rancho Cordova, CA (US)

(72) Inventors: Joseph D. Tarango, Longmont, CO (US); Randal Eike, Lyons, CO (US); Michael Allison, Longmont, CO (US); Eric Hoffman, Lafayette, CO (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,879

(22) Filed: May 12, 2023

(65) Prior Publication Data

US 2023/0281138 A1 Sep. 7, 2023

Related U.S. Application Data

(63) Continuation of application No. 16/833,422, filed on Mar. 27, 2020, now Pat. No. 11,687,471.

(51) Int. Cl.
*G06F 3/06* (2006.01)
*G06F 1/28* (2006.01)
*G06F 13/10* (2006.01)
*G06F 13/16* (2006.01)
*G06F 13/40* (2006.01)

(52) U.S. Cl.
CPC .......... *G06F 13/1668* (2013.01); *G06F 1/28* (2013.01); *G06F 13/102* (2013.01); *G06F 13/4068* (2013.01)

(58) Field of Classification Search
None
See application file for complete search history.

(56) References Cited

U.S. PATENT DOCUMENTS

| 8,090,899 | B1 | 1/2012 | Syu |
| 9,965,287 | B1 | 5/2018 | McKown |
| 2003/0046618 | A1 | 3/2003 | Collins |
| 2003/0115218 | A1* | 6/2003 | Bobbitt ................. G06F 16/188 |
| 2003/0159082 | A1 | 8/2003 | Brant et al. |
| 2003/0225955 | A1 | 12/2003 | Feldstein et al. |
| 2008/0282128 | A1 | 11/2008 | Lee et al. |
| 2009/0157973 | A1 | 6/2009 | Li et al. |

(Continued)

OTHER PUBLICATIONS

Matias Bjorling, "Open-Channel Solid State Drives", Mar. 12, 2015 (Year: 2015).*

(Continued)

*Primary Examiner* — Hyun Nam
(74) *Attorney, Agent, or Firm* — HALEY GUILIANO LLP

(57) ABSTRACT

A method is described. The method includes executing solid state drive program code from system memory of a computing system to perform any/all of garbage collection, wear leveling and logical block address to physical block address translation routines for a solid state drive that is coupled to a computing system that the system memory is a component of.

22 Claims, 4 Drawing Sheets

(56) References Cited

U.S. PATENT DOCUMENTS

| | | | |
|---|---|---|---|
| 2013/0179631 A1* | 7/2013 | Cepulis | G06F 3/0604 |
| | | | 711/103 |
| 2015/0142996 A1* | 5/2015 | Lu | G06F 12/0246 |
| | | | 710/26 |
| 2016/0034208 A1* | 2/2016 | Cepulis | G06F 3/0644 |
| | | | 705/26.7 |
| 2016/0070474 A1 | 3/2016 | Yu et al. | |
| 2016/0170850 A1* | 6/2016 | Williams | G06F 3/064 |
| | | | 714/6.23 |
| 2017/0277444 A1* | 9/2017 | Canepa | G06F 3/065 |
| 2018/0181304 A1* | 6/2018 | Mitra | G06F 3/061 |
| 2018/0321987 A1 | 11/2018 | Benisty | |
| 2019/0042119 A1* | 2/2019 | Sharma | G06F 3/0634 |
| 2019/0042128 A1 | 2/2019 | Tarango | |
| 2019/0042129 A1 | 2/2019 | Tarango et al. | |
| 2019/0042139 A1 | 2/2019 | Watt et al. | |
| 2019/0043604 A1 | 2/2019 | Baca et al. | |
| 2019/0294345 A1 | 9/2019 | Yu et al. | |
| 2019/0354318 A1 | 11/2019 | Foo | |
| 2020/0133898 A1* | 4/2020 | Therene | G06F 3/061 |
| 2020/0218649 A1 | 7/2020 | Dinges et al. | |
| 2020/0225857 A1 | 7/2020 | Tarango et al. | |
| 2020/0409696 A1 | 12/2020 | Ould-Ahmed-Vall | |
| 2020/0409698 A1 | 12/2020 | Ould-Ahmed-Vall | |
| 2020/0409784 A1 | 12/2020 | Ould-Ahmed-Vall | |

OTHER PUBLICATIONS

Matias Bjorling, "Open-Channel, Solid State Drives", Mar. 15, 2015, Vault (Year: 2015).

\* cited by examiner

| Virtual Block Context 302 | |
|---|---|
| LBA_0 | PBA_0015 |
| LBA_1 | PBA_7274 |
| LBA_2 | PBA_0453 |
| LBA_3 | PBA_1292 |
| LBA_4 | PBA_0149 |
| ... | ... |
| LBA_K | PBA_0799 |

| Physical Block Context 301 | |
|---|---|
| Memory_Chip_0; Block_0 | Meta_Data_0;0 |
| Memory_Chip_0; Block_1 | Meta_Data_0;1 |
| Memory_Chip_0; Block_2 | Meta_Data_0;2 |
| Memory_Chip_0; Block_3 | Meta_Data_0;3 |
| Memory_Chip_0; Block_4 | Meta_Data_0;4 |
| ... | ... |
| Memory_Chip_R; Block_S | Meta_Data_R;S |

Fig. 3

SOLID STATE DRIVE WITH EXTERNAL SOFTWARE EXECUTION TO EFFECT INTERNAL SOLID-STATE DRIVE OPERATIONS

CROSS-REFERENCE TO RELATED APPLICATION

This application is a continuation of U.S. patent application Ser. No. 16/833,422, filed Mar. 27, 2020, the disclosure of which is incorporated by reference in its entirety.

FIELD OF INVENTION

The field of invention pertains generally to the computing sciences, and, more specifically, to a solid state drive with external software execution to effect internal solid state drive operations.

BACKGROUND

With the onset of cloud computing, "big data", artificial intelligence and other computationally intensive environments, mass storage is revealing itself to be a critical component of overall computing system performance. As such, computing system designers are continually seeking ways to reduce the latencies, increase throughput, optimize power, and/or provide robustness of mass storage devices.

FIGURES

A better understanding of the present invention can be obtained from the following detailed description in conjunction with the following drawings, in which:

FIG. 3 shows a data structure employed by solid state drive program code that is executed out of a system memory;

DETAILED DESCRIPTION

Figure 1:
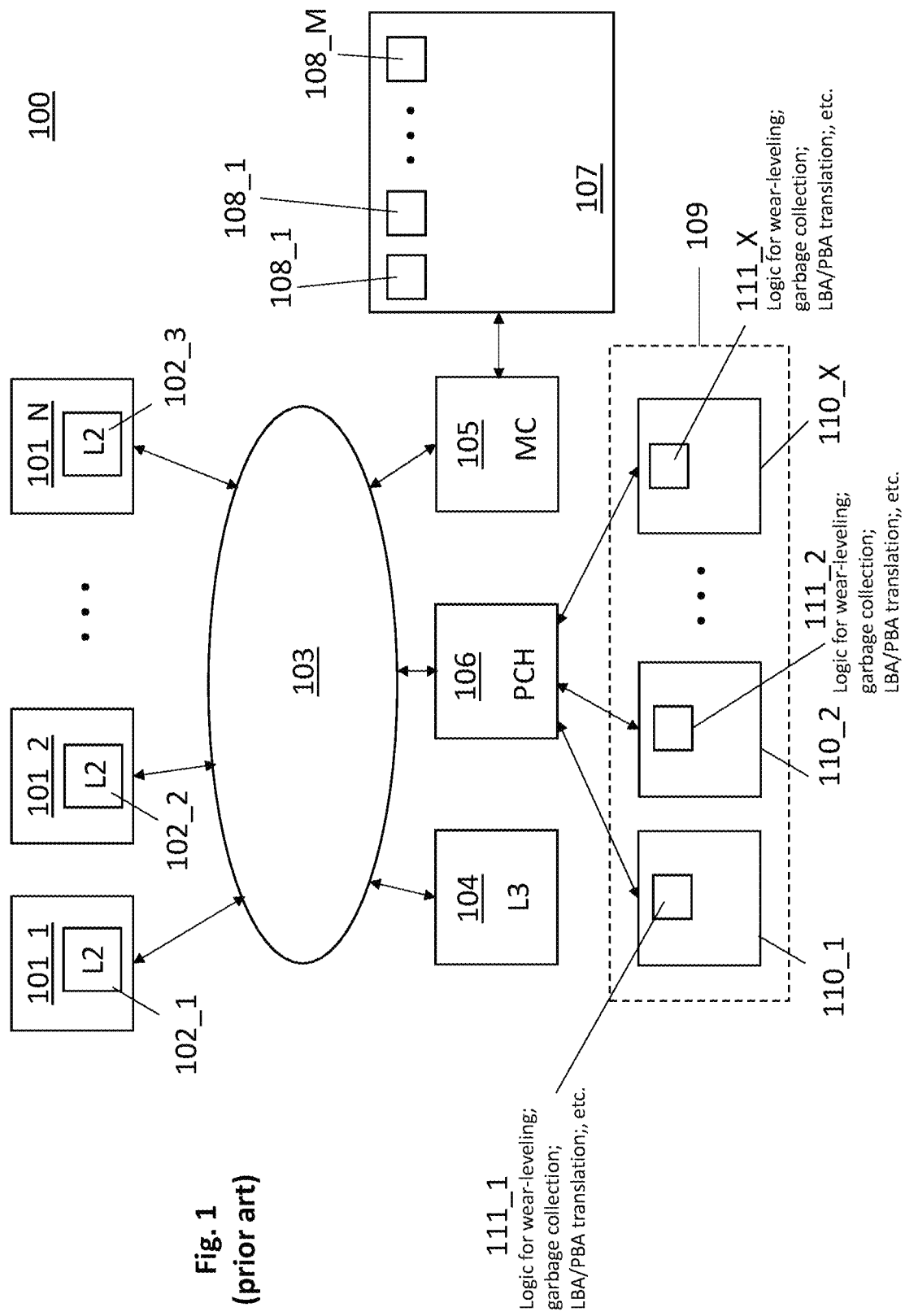
FIG. 1 shows a traditional computing system with solid state drives.

FIG. 1 shows a traditional multi-processor computer system 100. As observed in FIG. 1, the computer system includes a plurality of general-purpose, application-specific, and/or reconfigurable processing cores 101_1 through 101_N. Each of the processing cores typically include a plurality of instruction execution pipelines where each of these pipelines has its own dedicated L1 cache (not shown in FIG. 1 for illustrative ease) or scratch-pad memory. Each processing core also includes an L2 cache 102_1 through 102_N that services its instruction execution pipelines. The processing cores 101 are interconnected by a network 103 to one another, an L3 cache 104 (that services the processing cores), a system memory controller 105 and a peripheral control hub 106.

As is known in the art, if a thread of program code that is executing through one of the pipelines needs data that is not in the pipeline's register space, the program code will execute a memory access instruction that specifies the memory address of the needed data. Rather than immediately fetch the data from system memory 107 (also referred to as "main" memory), the system will instead look for the item of data in the pipeline's L1 cache. If the item is not in the L1 cache the system will next look to the L2 cache of the core that the pipeline is instantiated on. If the item is not in the L2 cache the system will look for the data item in the L3 cache 104. If the item is not in the L3 cache 104 it will then fetch the item from system memory 107 via the system memory controller 105 (also referred to as a main memory controller 105).

The L1 and L2 caches of the various cores as well as the L3 cache 104 are all cache coherent. Cache coherency is implemented with a protocol, such as the Modified Exclusive Shared Invalid (MESI) protocol that is executed at each caching location to ensure that the system does not write to two different versions of an item of data. Here, as multiple executing software threads on one or more of the pipelines and/or cores may concurrently desire same data with the intent of updating it with new information, the cache coherency protocol effectively prevents two different instances of the data being written to with different data by two different software threads.

As observed in FIG. 1, each of the threads that are executing on the various cores have their own dedicated operating space or "footprint" 108_1 through 108_M in system memory 107. Commonly, such a footprint exists for each software application that the system is currently executing. Each footprint 108 typically includes its corresponding thread's program code instructions and data. However, a thread's footprint typically does not contain all the program code that could be executed or all the data that can be operated on by the thread. As such, pages of program code and/or memory are called up from mass storage 109 and written into a thread's footprint as needed (commonly at the exclusion of other pages in the thread's footprint that are written back to mass storage to make room for the new pages).

With the onset of cloud computing, "big data", artificial intelligence and other computationally intensive environments, mass storage 109 is revealing itself to be a critical component of overall computing system performance. Here, many software applications need access to amounts of data that far exceed the application's footprint 108 allotment in main memory 107. As such, there tend to be frequent calls for pages from mass storage 109 (as observed in FIG. 1, mass storage is implemented with multiple mass storage devices 110_1 through 110_X coupled to a peripheral control hub (PCH) 106). The faster such pages can be fetched from mass storage 109, the less the risk that an application will stall waiting for pages of data to be fetched from mass storage 109 and entered into system memory 107.

Additionally, again to meet the overall increased need for large amounts of data, the storage capacities of the mass storage devices themselves 110_1 through 110_X (e.g., solid state drives (SSDs)) are steadily increasing with each new product generation.

A problem with the increased SSD capacity, however, is the increased functionality that each SSD is expected to support. Here, each SSD commonly includes a controller and associated memory to execute logic 111_1 through 111_X that oversees the operation of the SSD. Such oversight commonly includes: 1) wear leveling; 2) garbage collection; and, 3) logical block address (LBA) to physical block address (PBA) translation.

The physical storage media blocks/cells of an SSD (e.g., NAND flash, three dimensional cross-point nonvolatile random access memory (NVRAM) such as Optane™ memory from Intel corporation, QuantX™ memory from Micron, etc.) can degrade/wear-out if they are written to too frequently. As such, in performing wear leveling, SSD controller logic 111 will track which of its blocks have been most frequently written to and, upon some threshold being crossed, will interrupt SSD operations to read the "hot" data from its current block(s) and write the same into other blocks that have been written to less frequently.

In order to write hot data to another block, the other block must first be "cleaned". Thus, in order to support wear-leveling, SSD controller logic 111 also performs garbage collection. Garbage collection is the process of identifying blocks whose data is stale (e.g., its data was moved to another block) or hardly accessed and preparing them to be overwritten with new data. In the case of an identified stale block, the block is erased and placed on a free list of eligible blocks to be freshly written to. In the case of a block whose data is not stale but hardly accessed, the block's data is read and written to another block. The block is then erased and placed on the free list.

Because the SSD controller logic 111 swaps or changes the physical blocks that specific data is stored in, the SSD controller logic 111 also performs LBA to PBA address translation. Here, when the larger host computer system desires to access a specific page or pages of data, it identifies the data with an LBA. The SSD controller then converts the LBA to the physical block(s) within the SSD where the data actually resides. Here, each time a wear leveling operation causes data to be moved to a different block(s), an LBA to PBA table needs to be updated to reflect the new physical location of the data within the SSD.

Unfortunately, with the ever-expanding storage capacity of SSDs, their wear leveling, garbage collection and LBA-to-PBA translations are becoming more computationally intensive, which, in turn, is affecting SSD latencies from the perspective of the host. That is, with each new SSD generation, it is becoming more difficult to manufacture a "faster" SSD. Instead, SSDs are at risk at exhibiting longer on average read/write latencies as compared to their earlier generations.

Further still, integrating computationally intensive functions into the SSD for execution by the SSD controller increases SSD power consumption. Thus, as SSD storage capacity expands, SSDs are becoming slower and more power hungry.

An SSD device driver software instance is typically "plugged into" an operating system or operating system instance for each SSD that is integrated into the system. An SSD's device driver software is commonly used to configure or otherwise access the SSD through software. The device driver commonly accepts commands from a higher layer of software, such as the operating system or application and, from these commands, generates commands for the SSD controller. The SSD controller, through execution of the SSD's local firmware, processes the commands in response. Here, there are multiple distinct layers of SSD program code that are concurrently executed: 1) the device driver software that is executed on a processing core 101 as software; 2) firmware that executes the logic 111 within the SSD itself; and, 3) component microcode operating on the component. Having multiple distinct layers of complex program concurrently executing for an SSD also adds to overall SSD latency.

Figure 2:
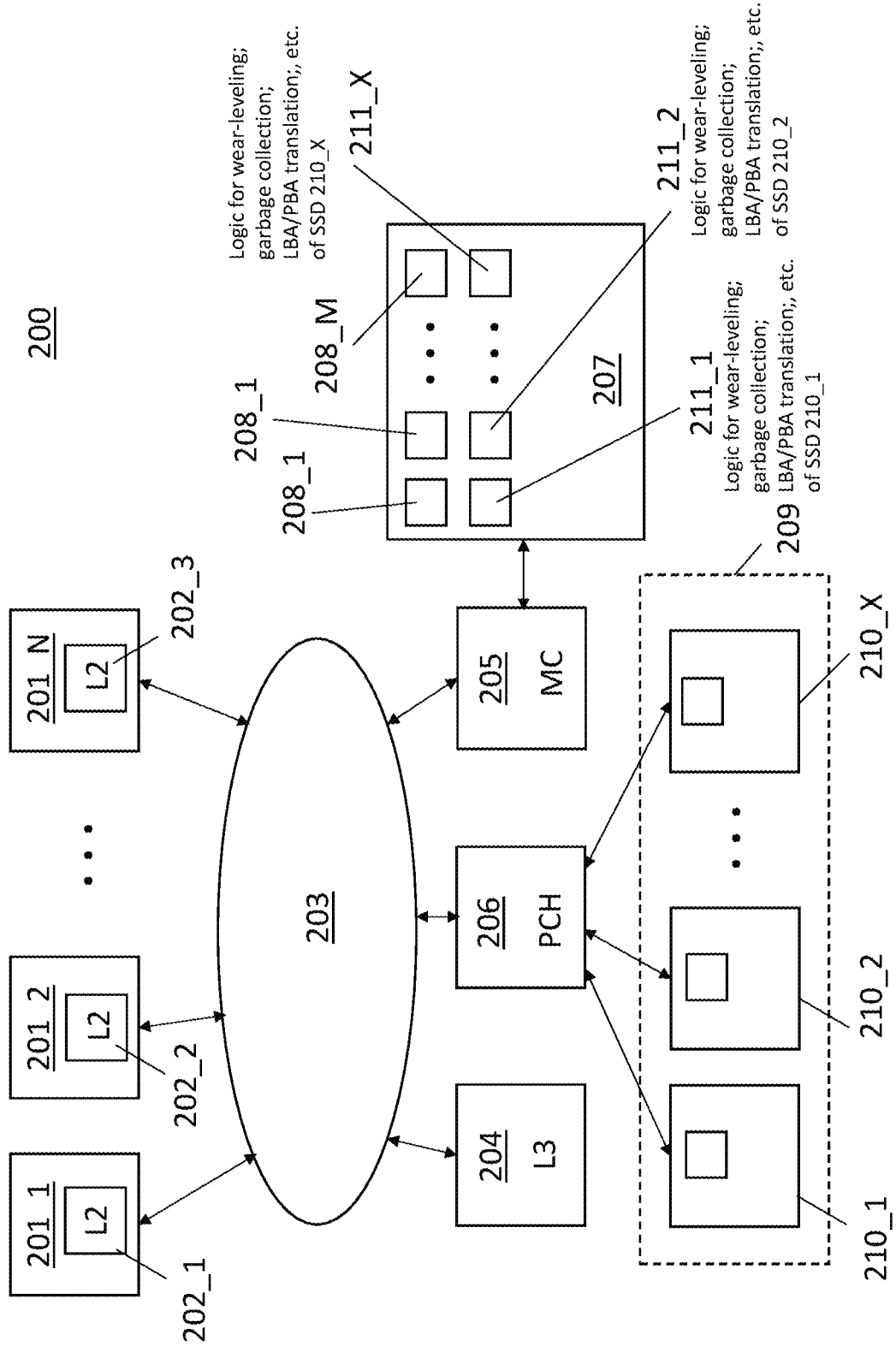
FIG. 2 shows an improved computing system with solid state drives.

A solution to any/all of these issues is depicted in FIG. 2. As observed in FIG. 2, some or all of the SSD's local logic functionality 211 that has traditionally been performed by the SSD's controller is instead implemented as a thread executing on a generally purpose CPU core (as observed in FIG. 2, multiple SSDs 210_1 through 210_X are coupled to a peripheral control hub (PCH) 206). That is, to the extent SSD controllers have traditionally executed "firmware" that was locally stored and executed within the SSD (with a controller/processor and memory integrated within the SSD) to implement the logic 111, the firmware program code (or at least program code to effect the logic 111 of traditional SSD firmware), in the approach of FIG. 2, is instead instantiated as a footprint 211 in system memory 207. The low-level controller operations for the SSD that were traditionally executed as local firmware within the SSD are then instead executed with a general-purpose processing core 201 thread from the system memory footprint, e.g., no differently than a nominal application software program.

With the low-level computationally intense SSD controller operations being largely stripped out of the SSDs 210 and instead implemented more as a nominal application software programs, the SSDs 210 should exhibit an immediate speed-up, increased operating power potential of the device, and reduction in energy foot-print. For instance, whereas traditional SSD read or write (referred to as "program") operations were stalled pending wear leveling or garbage collection performed by the SSD controller, or, slowed down because of the LBA-to-PBA translation performed by the SSD controller, in the approach of FIG. 2, the SSDs 210 themselves, in various embodiments, do not track hot vs. cold blocks, determine which blocks have crossed a hot relative threshold for wear-leveling, identify blocks for garbage collection, or perform LBA-to-PBA translations or perform other related operations (such as identify error blocks, retire error blocks, perform media width write mode context switches (single level cell (SLC), multi-level cell (MLC), triple-level cell (TLC), quad level cell (QLC), etc.), re-vector blocks to new translations, reordering operations, etc.). Instead all such functions are executed out of main memory by a general-purpose processing core.

Moreover, with such computationally intense operations being stripped out of the SSDs 210, the SSDs 210 should consume less power per unit of stored data. Further still, whereas the prior art approach of FIG. 1 utilized two distinct layers of complex and concurrently integrated program code to use and implement an overall SSD, by contrast, in the approach of FIG. 2, device driver and traditional firmware logic can be synthesized into a single instance of program code 211 for each SSD as a single "tighter" layer of software that subsumes the functionality of the traditional SSD device driver and firmware.

Even further, traditionally, only an SSD controller had exposure to deeper context details of an SSD that higher level program code, such as the SSD's device driver, was not privy to. Specifically, traditional SSDs typically contain internal register space (e.g., embedded on the SSD's memory chips, the SSD's controller chip or any other SSD internal hardware such as a field programmable array (FPGA) (e.g., used for accelerating various processes) that are not visible outside the SSD and are accessed only by the SSD controller to program specific features of the SSD.

The set of configurable register space, referred to as the SSD's register or configuration "context", is traditionally used to establish certain modes and/or functions performed by the SSD controller other than garbage collection, wear leveling and LBA-PBA translation such as bandwidth arbitration (where the SSD negotiates with the host for a particular speed of communication between the SSD and host); media block packing (programming the storage cell density of one or more memory blocks (e.g., as one of SLC, MLC, TLC, QLC,); redundancy (storing multiple instances of a single data item); detection of errors; correction of errors; data refresh (re-programming same data into a cell that has been resident in the cell for an extended period of time); encryption of data (for security protection); configuration of an internal hardware accelerator within the SSD (such as a field programmable gate array (FPGA) that is configured to perform internal performance tracking and statistics); configuring depth and/or service rate of queue(s) within the SSD (e.g., to serve a particular host/SSD interface speed); snooping of a command queue (which is also implemented in main memory) to consolidate multiple identical commands into a single command, etc. In the instant approach, any/all of these functions can be partially or wholly performed outside the SSD as, e.g., program code that executes out of system memory. Again, commands from the executing program code on the computer host would be directed to the SSD through the host's hardware (e.g., via a peripheral control hub) to, e.g., write to and/or read from registers within the SSD to cause any/all of these functions to be performed and provide and/or report any specific parameters they are to operate according to.

As such, register or configuration context within an SSD (which describes the SSD's internal context) that traditionally was only accessible to the SSD controller but in the new approach can be made programmable and/or visible to program code executing out of system memory includes, among other possible context information, register space at least to: 1) individually turn nonvolatile memory chips on or off, and/or, individually enable them; 2) record information that indicates whether error detection is enabled and if so what type of error detection is being utilized (e.g., parity, cyclic redundancy check, etc.); 3) record information that indicates whether error correction coding (ECC) is to enabled or disabled (e.g., for individual memory chips or groups of memory chips) and if so what specific ECC algorithm is to be performed; 4) record information that indicates whether or not a memory chip or portion thereof has its data encrypted and if so what type of encryption is to be applied; 5) information that specifies what protocol is to be implemented at the SSD/host interface (e.g., peripheral component interconnect express (PCIe), Non-Volatile Memory Express (NVMe), Serial AT Attachment (SATA), etc.); 6) information that indicates whether data is to be replicated or not (e.g., a second version of data stored in a block is additionally stored in another block to protect against loss of the data), and/or any other register space to help implement any/all of the functions named in the preceding paragraph, etc.

With the ability to configure such SSD context from an executing application, as in the approach of FIG. 2, certain fine-tuned, precise operational efficiencies can be realized that heretofore have not been possible. One example is very precisely controlled SSD bring-up during power-on and/or reset. For example, traditionally, when an SSD was powered on or reset, it was difficult to bring up its power consumption gradually in a series of tightly controlled sequential steps. That is, the SSD was more or less fully "on" including, e.g., all memory chips and/or other hardware within the SSD. As such, the power consumption of the SSD exhibited a step function response. That is, the SSD was either "off" in which case its power consumption was low, or, the SSD was "on" in which case its power consumption was high (e.g., because all memory chips in the SSD were powered on).

By contrast, with the exposure of SSD context to the SSD's footprint/application as in the approach of FIG. 2, the power consumption of an SSD can be very precisely controlled with software, such as, turning specific memory chips and/or accelerators on according to a very specific bring-up sequence. That is, over time, the power consumption of the SSD can be brought up more as a staircase function rather than a step function. For example, rather than turn on all of the SSD's memory chips as soon as the SSD is powered on, instead, individual memory chips are power-on only as needed as the SSD begins to fill up with data.

In an embodiment, the footprint/application code 211 for an SSD in system memory 207 can require secure, read only memory entrance for SSD boot-up. In an embodiment, the boot-up process for an SSD that is executed out of the SSD's footprint/application 211 in system memory 207 causes the SSD to perform the following bring-up sequence: 1) enable the SSD's host interface (e.g., PCIe); 2) wait for the host (e.g., a multi-processor CPU system-on-chip (SOC) semiconductor chip) to acknowledge to the presence of the SSD through the SSD's host interface; 3) prepare the SSD's memory chips for power up; and, 4) enable any on-board SSD accelerators as desired (e.g., cyclic redundancy check (CRC)/error correction coding (ECC) accelerator, encryption/decryption accelerator, media channel queue accelerator, performance trace analysis accelerators, numerical computation accelerators). Any/all other SSD configuration context can be rapidly swapped as needed from system memory by the executing SSD footprint to the SSD.

In various embodiments, the sequence is effected through a sequence of commands generated by the executing SSD footprint/application code that are issued to the SSD from the CPU SOC, and, status message responses sent from the SSD back to the CPU SOC and executing SSD footprint code. When issuing a command to the SSD, the SSD's footprint/application code may write to reserved register space within the host CPU processor and/or memory mapped I/O (MMIO) within system memory. The hardware then physically transports the commands to the SSD through the host/SSD interface. Similarly, the SSD, through the host/SSD interface can write responses messages to CPU SOC register space or MMIO space. As such, the solid state drive is to receive a request for information from a host system that the solid state drive is coupled to, where, the information describes the solid state drive's internal context. The solid state drive, in response, internally fetches the information and then sends the information to the host system to support the host system's execution of the various SSD tasks it performs.

FIG. 3 shows an embodiment of a data structure 300 used by an SSD's footprint/application to perform LBA-to-PBA translations for the SSD. Here, the data structure 300 includes both a physical block context 301 and a virtual block context 302. The physical block context 301 contains meta data for each block in each memory chip in the SSD (e.g., in tabular form). For each such physical block the meta data describes whether the block is healthy, provisionally defective, defective or offline. In further embodiments the meta data can track accesses to each physical block and/or whether or not some of block's data (e.g., which pages) or all of a block's data is invalid or erased (e.g., for garbage collection and/or wear leveling purposes). The physical block context can also include a log that temporarily records recent changes made to the physical blocks.

The virtual block context 302 effectively contains the LBA-to-PBA mapping. With the footprint/application also containing garbage collection and wear leveling logic, the footprint/application determines when a block is deemed "hot" (based on the meta data in the physical block context 301) and should have its data moved to another block, which free block the data is to be moved to as well as garbage collection and erasure scheduling to maintain a pool of free blocks. As the footprint/application commands the SSD to move physical data from one block to another block, the virtual context changes 302 is updated with a new PBA for the particular LBA that the moved data corresponds to.

Because LBA-to-PBA mapping is performed in the host by the executing SSD footprint/application from system memory, note that any read/write/erase command that is issued by the footprint/application to the SSD specifies a PBA and not an LBA. That is, a PBA rather than an LBA is passed from the host hardware (the CPU SOC) to the actual SSD. Any host applications that use the SSD as mass storage invoke the SSD's footprint/application in system memory via an API with the LBA for the affected block(s) being specified through the API. The SSD footprint/application then performs the LBA-to-PBA mapping and issues the corresponding command (e.g., read, program) with the PBA to the SSD.

By exposing intricate details such as register context, physical block state and LBA-to-PBA mapping of each SSD in a computing system to higher level software, such software can better load balance its SSD resources to ultimately effect better SSD latencies than traditional systems. Specifically, in traditional computing systems, only SSD controllers had vision into the request queues of their respective SSDs. Here, each SSD device typically has queuing space to queue commands received from the host. If the host feeds a large number of requests to an SSD in a short amount of time, the SSD's queue is apt to queue a significant number of the requests which, in turn, results in reduced SSD response (the SSD will not service, e.g., most/all of the queued requests until the all of the preceding requests in the queue have been serviced).

By contrast, with the improved approach of FIG. 2, the state of an SSD's footprint/application code in system memory can have the knowledge of its SSD's internal command queue state. With knowledge of the queue state within each SSD in the system, software (such as database software or operating system software) can better load balance the SSDs in the system and favor sending storage requests to SSDs having less full internal queues over SSDs having more full internal queues. Ideally, queueing delay across the SSDs as a whole will be less than in a traditional system where no such visibility into SSD queue state and corresponding load balancing exists.

Here, generally, the controlling operating system or operating system instance oversees and controls how many pages of an application are in system memory and which of the application's pages are in system memory. That is, the operating system or operating system instance knows when an application needs to bring up pages from mass storage to system memory and determines which of the application's pages are to be evicted from system memory to make room for the incoming pages being called up from mass storage.

The improved approach of FIG. 2 allows for more fine-tuned control of page movement between system memory and mass storage, by, e.g., conditioning such page movement on the internal queue states of the SSDs that will be affected by the page movement. That is, higher level software will push page movement related commands (e.g., reads from mass storage of new pages for entry into system memory and writes of pages evicted from system memory into mass storage) to SSDs that the software can see has a lower internal command queue state rather than push such commands to SSDs that the software can see has higher internal command queue state. To the extent such software is designed to make such page movements in advance (i.e., pages are called up from mass storage before they are actually needed), the overall system should see reduced SSD latencies without any application software stalls.

Furthermore, SSDs can be teamed in pools to directly offload operations between data movement, swapping, and/or replication. These teamed identifiers can then be used in such a manner that each identifier group will snoop operations such as writes to duplicate internal write commands with reduction in commands from many to one increasing the host system bus bandwidth potential.

Even further, once an instance of traditional SSD firmware program code is instantiated in system memory, it is capable of being re-purposed for some other hardware component. For example, program code to implement any encryption algorithm can also be used by any of a general-purpose processing core, graphical processing unit, FPGAs, artificial intelligence units, networking chips, etc. Thus, in various embodiments, there exists an application programming interface (API) that is invokable not only to implement SSD operations but also operations for other hardware components within the overall computer.

Note that, in order to help support the host system execute out of system memory and/all of the aforementioned functions that have traditionally been executed within a solid state drive, a solid state drive (including its controller) may be designed or otherwise configured to send certain information to the host (e.g., status information, confirmation of executed commands, confirmation of message receptions, etc.).

Figure 4:
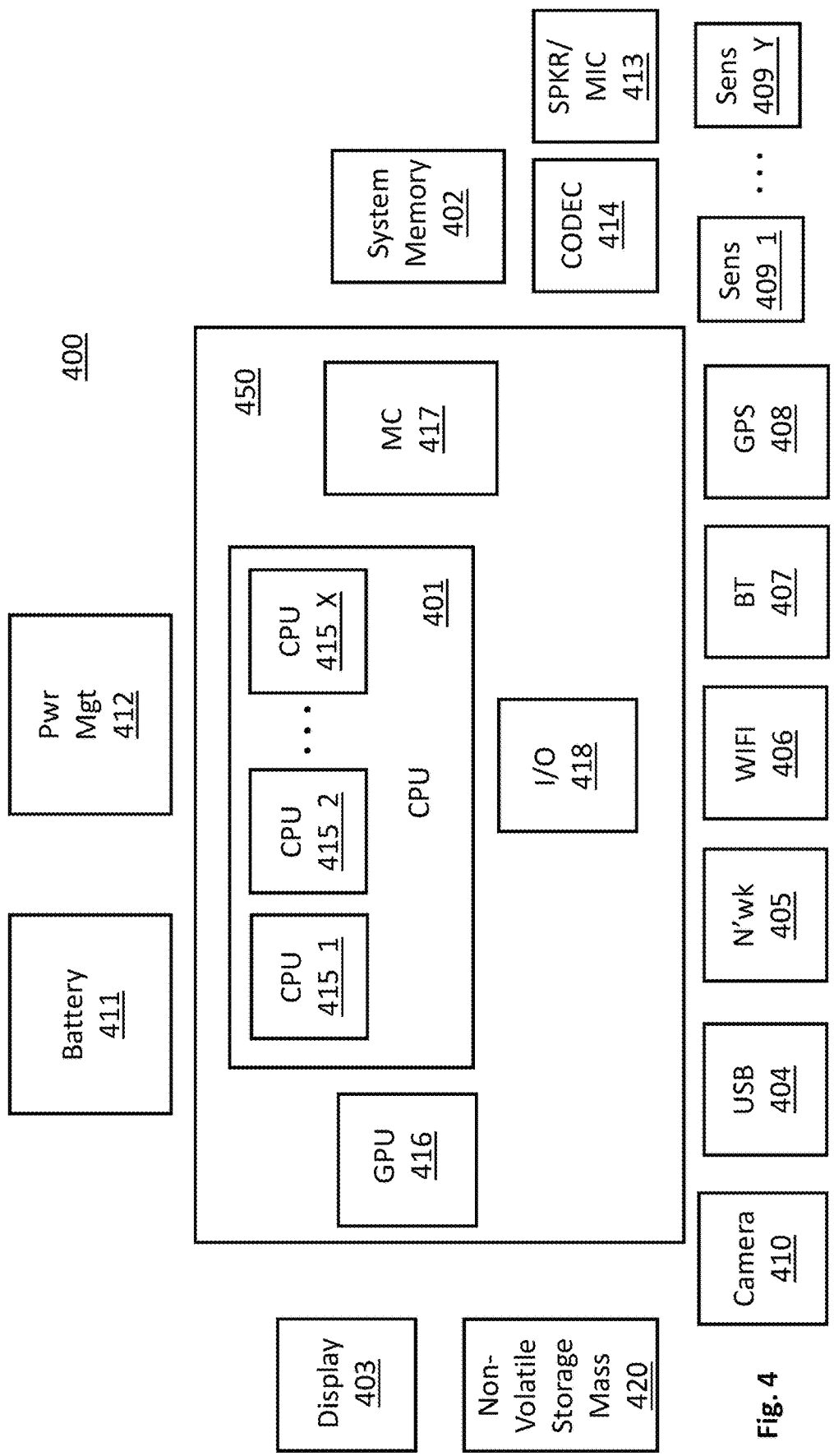
FIG. 4 shows a computing system.

Finally, although embodiments above mentioned flash memory mass storage SSDs, in yet other embodiments, the nonvolatile memory SSD is implemented with a three dimensional nonvolatile random access memory composed, e.g., of an emerging nonvolatile storage cell technology. Examples include Optane™ memory from Intel Corporation, QuantX™ from Micron Corporation, and/or other types of resistive non-volatile memory cells integrated amongst the interconnect wiring of a semiconductor chip (e.g., resistive random-access memory (ReRAM), ferroelectric random access memory (FeRAM), spin transfer torque random access memory (STT-RAM), etc.). At least some of these memories are byte addressable and therefore can be used in a system memory role rather than a mass storage role. As such, firmware for memory modules for use as nonvolatile system memory can also be executed externally from the memory module as, e.g., a nominal software application FIG. 4 provides an exemplary depiction of a computing system 400 (e.g., a smartphone, a tablet computer, a laptop computer, a desktop computer, a server computer, etc.). As observed in FIG. 4, the computing system 400 may include a central processing unit (CPU) 401 (which may include, e.g., a plurality of general purpose processing cores 415_1 through 415_X) and a main memory controller 417 (also referred to as a system memory) disposed on a multi-core processor or applications processor, main memory 402 (also referred to as system memory), a display 403 (e.g., touchscreen, flat-panel), a local wired point-to-point link (e.g., Universal Serial Bus (USB)) interface 404, various network I/O functions 405 (such as an Ethernet interface and/or cellular modem subsystem), a wireless local area network (e.g., WiFi) interface 406, a wireless point-to-point link (e.g., Bluetooth) interface 407 and a Global Positioning System (GPS) interface 408, various sensors 409_1 through 409_Y, one or more cameras 410, a battery 411, a power management control unit 412, a speaker and microphone 413 and an audio coder/decoder 414.

An applications processor or multi-core processor 450 may be an SOC that includes one or more general purpose processing cores 415 within its CPU 401, one or more graphical processing units 416, a main memory controller 417 and an I/O control function 418 (peripheral control hub). The general-purpose processing cores 415 typically execute the system and application software of the computing system. The graphics processing unit 416 typically executes graphics intensive functions to, e.g., generate graphics information that is presented on the display 403. The computing system can also include other types of processing units that are tangential to cores 415 such as: 1) an artificial intelligence processing unit to execute neuro-network synapse-based operations to learn and optimize based on state; 2) at least one reconfigurable processing unit composed of an array of memory blocks and accelerators to compute specialized operations. The main memory controller 417 interfaces with the system memory 402 to write/read data to/from system memory 402.

Any of the system memory 402 and/or non-volatile mass storage 420 can be composed with a three dimensional nonvolatile random access memory composed, e.g., of an emerging nonvolatile storage cell technology. Examples include Optane™ memory from Intel Corporation, QuantX™ from Micron Corporation, and/or other types of resistive non-volatile memory cells integrated amongst the interconnect wiring of a semiconductor chip (e.g., resistive random-access memory (ReRAM), ferroelectric random access memory (FeRAM), spin transfer torque random access memory (STT-RAM), etc.). Non-volatile mass storage 420 at least can also be composed of flash memory (e.g., NAND flash). Regardless of the specific nonvolatile memory type that is utilized for mass storage, as described above, the nonvolatile memory may be integrated into SSDs whose firmware has effectively migrated up to system memory as described at length above.

Each of the touchscreen display 403, the communication interfaces 404-407, the GPS interface 408, the sensors 409, the camera(s) 410, and the speaker/microphone codec 413, 414 all can be viewed as various forms of I/O (input and/or output) relative to the overall computing system including, where appropriate, an integrated peripheral device as well (e.g., the one or more cameras 410). Depending on implementation, various ones of these I/O components may be integrated on the applications processor/multi-core processor 450 or may be located off the die or outside the package of the applications processor/multi-core processor 450. The power management control unit 412 generally controls the power consumption of the system 400.

Although the discussion of FIG. 4 above has discussed the CPU 401, graphical processing unit(s) 416, main memory controller 417 and peripheral control hub 418 as being components of an SOC, the general architecture of FIG. 4 should be understood to be applicable to any of a wide number of different types of computing system implementations. For example, as just one possibility, the computer of FIG. 4 can also be implemented as a rack mounted system where the CPU 401, main memory controller 417 and peripheral control hub 418 are all separate components that plug into a common rack. An example is an Open Compute Project (OCP) implementation or the like for, e.g., raised floor or data center applications.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., field programmable gate array (FPGA), programmable logic device (PLD)) for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD Read-Only-Memories (ROMs), and magneto-optical disks, flash memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

A computing system has been described. The computing system includes a plurality of processing cores; a system memory controller; a peripheral control hub; a solid state drive coupled to the peripheral control hub; and, a system memory coupled to the system memory controller. The system memory comprising program code to perform any of the following within the solid state drive: wear leveling; garbage collection; logical block address (LBA) to physical block address (PBA) translation; the solid state drive's negotiation for bandwidth arbitration; media block packing; redundancy; error detection; error correction; data refresh; encryption; configuration of a hardware accelerator within the solid state drive; configuring depth and/or service rate of a queue within the solid state drive; and, snooping of a command queue and consolidating multiple commands for the solid state drive into single command.

The program code is to program register space within the solid state drive. The register space is to implement any of the following: i) enabling a memory chip within the solid state drive; and, ii) enabling a static or dynamic hardware accelerator within the solid state drive. The register space is to implement any of the following: i) whether error detection is to be enabled; ii) what type of error detection is to be applied; and, ii) controller status or state to be enabled or/and applied. The program code is able to be re-purposed for execution by any of the following hardware units within the computing system: a general-purpose processing core; a graphics processing unit; a field programmable gate array (FPGA); an artificial intelligence unit; and, a networking unit.

The program code is to sequentially enable components within the solid state drive to effect a staircase power consumption profile by the solid state drive during bring-up of the solid state drive. The system memory can include other respective instances of program code for other solid state drives of the computing system. The program code and each of the instances of program code are designed to expose their respective solid state drive's command queue to higher level software. The computing system can include load balancing program code stored in the system memory to favor the sending of storage commands to those of the solid state drives whose command queues are less occupied over those of the solid state drives whose command queues are more occupied. The peripheral control hub can send a physical block address to the solid state drive when sending a read command or program command to the solid state drive.

A method is described. The method includes executing solid state drive program code from system memory of a computing system to perform any/all of the following for a solid state drive that is coupled to the computing system: wear leveling; garbage collection; logical block address (LBA) to physical block address (PBA) translation; the solid state drive's negotiation for bandwidth arbitration; media block packing; redundancy; error detection; error correction; data refresh; encryption; configuration of a hardware accelerator within the solid state drive; configuring depth and/or service rate of a queue within the solid state drive; and, snooping of the solid state drive's command queue and consolidating multiple commands for the solid state drive into a single command.

The executing of the solid state drive program code is to program register space within the solid state drive. The programming of the register space is to: i) enable a memory chip within the solid state drive; and, ii) enable a hardware accelerator within the solid state drive. The programming of the register space is to: i) enable error detection; and, ii) establish what type of error detection is to be applied. The programming of the register space is to: i) enable error correction encoding; and, ii) establish what type of error correction encoding is to be applied. The executing of the program code causes components within the solid state drive to be sequentially enabled to affect a staircase power consumption profile by the solid state drive during bring-up of the solid state drive. The executing of the program code exposes the solid state drive's command queue to higher level software.

The method can further include exposing respective command queues of solid state drives to the higher level software through execution of their respective instances of program code in the system memory. The higher level software can favor sending commands to those of the solid state drives whose command queues are less occupied over those of the solid state drives whose commands queues are more occupied. The method can further include sending a read command or program command to the solid state drive with a physical block address.

An apparatus has been described. The apparatus includes a solid state drive that is to receive a request for information from a host system that the solid state drive is coupled to. The information describes the solid state drive's internal context. The solid state drive is to internally fetch the information in response and then send the information to the host system to support the host system's execution of any the following performed for the solid state drive: wear leveling; garbage collection; logical block address (LBA) to physical block address (PBA) translation; the solid state drive's negotiation for bandwidth arbitration; media block packing; redundancy; error detection; error correction; data refresh; encryption; configuration of a hardware accelerator within the solid state drive; configuring depth and/or service rate of a queue within the solid state drive; and, snooping of a command queue and consolidating multiple solid state drive commands into a single command. The garbage collection, wear leveling and logical block address to physical block address translation routines are to be performed by executing program code instantiated in the host system's system memory with a general-purpose processing core of the host system.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A computing system, comprising:
   processing circuitry;
   a peripheral control hub;
   a plurality of solid state drives coupled to the peripheral control hub, each respective solid state drive of the solid state drives comprising respective mass storage memory and a respective configuration context describing an internal context of the respective solid state drive; and,
   a system memory to have allocated operating space for different application software programs executed by the processing circuitry, the system memory comprising program code outside of the solid state drives to be responsible for executing, by the processing circuitry, internal solid state drive operations within each respective solid state drive of the plurality of solid state drives,
   wherein the system memory comprises additional program code having visibility to the configuration context of each of the plurality of solid state drives, the additional program code for load balancing the solid state drives by at least determining an internal command queue state of each respective solid state drive of the plurality of solid state drives based on the respective configuration context, and when an internal command queue state of a first solid state drive of the plurality of solid state drives is indicative of being less full than a second of the solid state drives, sending a storage request to the first solid state drive.

2. The computing system of claim 1, wherein the internal solid state drive operations within each respective solid state drive of the plurality of solid state drives comprise at least one of:
   wear leveling;
   garbage collection;
   logical block address (LBA) to physical block address (PBA) translation;
   the solid state drive's negotiation for bandwidth arbitration;
   media block packing;
   redundancy;
   error detection;
   error correction;
   data refresh;
   encryption;
   configuration of a hardware accelerator within the solid state drive;
   configuring depth and/or service rate of a queue within the solid state drive; and
   snooping of a command queue and consolidating multiple commands for the solid state drive into single command.

3. The computing system of claim 1 wherein the program code is to program respective register space within the solid state drives.

4. The computing system of claim 3 wherein the register space is to implement any of the following:
   i) enabling a memory chip within the solid state drive; and,
   ii) enabling a static or dynamic hardware accelerator within the solid state drive.

5. The computing system of claim 3 wherein the register space is to indicate any of the following:

i) whether the error detection is to be enabled;
ii) a type of the error detection; and,
iii) controller status or state to be enabled or/and applied.

6. The computing system of claim 1 wherein the program code is able to be re-purposed for execution by any of the following hardware units within the computing system:
a general-purpose processing core;
a graphics processing unit;
a field programmable gate array (FPGA);
an artificial intelligence unit; and,
a networking unit.

7. The computing system of claim 1 wherein the program code is to sequentially enable components within the solid state drives to effect a respective staircase power consumption profile by the solid state drive during bring-up of the solid state drives.

8. The computing system of claim 1 wherein the peripheral control hub sends a physical block address to a solid state drive of the plurality of solid state drives when sending a read command or program command to the solid state drive.

9. The computing system of claim 1 wherein the additional program code is further for load balancing the solid state drives by sending a data request to a solid state drive of the plurality of solid state drives to request data before it is needed when the additional program code identifies the internal command queue of the solid state drive as being lower.

10. A method, comprising:
executing solid state drive program code from system memory of a computing system with processing circuitry, the system memory to have allocated operating space outside of a plurality of solid state drives, each respective solid state drive of the solid state drives comprising respective mass storage memory and a respective configuration context describing an internal context of the respective solid state drive and each solid state drive is coupled to the computing system for different application software programs executed by the processing circuitry, the executing of the solid state drive program code is to execute, by the processing circuitry, internal solid state drive operations for each respective solid state drive of the plurality of solid state drives that is coupled to the computing system,
wherein the system memory comprises additional program code having visibility to the configuration context of each of the plurality of solid state drives, the additional program code for load balancing the solid state drives by at least determining an internal command queue state of each respective solid state drive of the plurality of solid state drives based on the respective configuration context, and when an internal command queue state of a first solid state drive of the plurality of solid state drives is indicative of being less full than a second of the solid state drives, sending a storage request to the first solid state drive.

11. The method of claim 10 wherein to execute, by the processing circuitry, internal solid state drive operations for each respective solid state drive of the plurality of solid state drives that is coupled to the computing system comprises executing, by the processing circuitry, at least one of the following for each respective solid state drive of the plurality of solid state drives that is coupled to the computing system:
wear leveling;
garbage collection;
logical block address (LBA) to physical block address (PBA) translation;
the solid state drive's negotiation for bandwidth arbitration;
media block packing;
redundancy;
error detection;
data refresh;
encryption;
configuration of a hardware accelerator within the solid state drive;
configuring depth and/or service rate of a queue within the solid state drive; and,
snooping of the solid state drive's command queue and consolidating multiple commands for the solid state drive into a single command.

12. The method of claim 10 wherein the method further comprises executing the solid state drive program code to program respective register space within the solid state drives.

13. The method of claim 12 wherein the programming of the register space is to:
i) enable a memory chip within the solid state drive; and,
ii) enable the hardware accelerator within the solid state drive.

14. The method of claim 12 wherein the programming of the register space is to:
i) enable the error detection; and,
ii) establish a type of the error detection.

15. The method of claim 12 wherein the programming of the register space is to:
i) enable error correction encoding; and,
ii) establish what type of error correction encoding is to be applied.

16. The method of claim 10 wherein the executing of the program code causes components within the solid state drives to be sequentially enabled to affect a respective staircase power consumption profile by the solid state drives during bring-up of the solid state drives.

17. The method of claim 10 further comprising sending a read command or program command to a solid state drive of the plurality of solid state drives with a physical block address.

18. The method of claim 10 wherein the method further comprises performing the additional program code further for load balancing the solid state drives by sending a data request to a solid state drive of the plurality of solid state drives to request data before it is needed when the additional program code identifies the internal command queue of the solid state drive as being lower.

19. An apparatus, comprising:
a plurality of solid state drives, the solid state drives each comprising respective mass storage memory and is to receive a request for information from a host system that each solid state drive is coupled to, the information describing each solid state drive's respective internal context, the plurality of solid state drives to internally fetch the information in response and then send the information to the host system wherein the information is responsible for executing, by the host system, internal solid state drive operations performed outside of the plurality of solid state drives for each respective solid state drive,
wherein the host system is configured for load balancing the solid state drives by at least determining an internal command queue state of each respective solid state drive of the plurality of solid state drives based on the internal context, and when an internal command queue state of a first solid state drive of the plurality of solid state drives is indicative of being less full than a second of the solid state drives, sending a storage request to the first solid state drive.

20. The apparatus of claim 19 wherein internal solid state drive operations performed outside of the plurality of solid state drives for each respective solid state drive comprise at least one of:
   wear leveling;
   garbage collection;
   logical block address (LBA) to physical block address (PBA) translation;
   the solid state drive's negotiation for bandwidth arbitration;
   media block packing;
   redundancy;
   error detection;
   error correction;
   data refresh;
   encryption;
   configuration of a hardware accelerator within the solid state drive;
   configuring depth and/or service rate of a queue within the solid state drive; and,
   snooping of a command queue and consolidating multiple solid state drive commands into a single command.

21. The apparatus of claim 19 wherein the garbage collection, wear leveling and logical block address to physical block address translation routines are to be performed by executing program code instantiated in the host system's system memory with a general-purpose processing core of the host system.

22. The apparatus of claim 19 wherein the host system is further configured for load balancing the solid state drives by sending a data request to a solid state drive of the plurality of solid state drives to request data before it is needed when the host system identifies the internal command queue of the solid state drive as being lower.

* * * * *